US008093748B2

(12) United States Patent
Martins

(10) Patent No.: US 8,093,748 B2
(45) Date of Patent: Jan. 10, 2012

(54) UNIVERSAL POWER INLET SYSTEM FOR POWER DISTRIBUTION UNITS

(75) Inventor: Carlos E. Martins, Fremont, CA (US)

(73) Assignee: Avocent Huntsville Corporation, Huntsville, AL (US)

( * ) Notice: Subject to any disclaimer, the term of this patent is extended or adjusted under 35 U.S.C. 154(b) by 96 days.

(21) Appl. No.: 12/247,744

(22) Filed: Oct. 8, 2008

(65) Prior Publication Data

US 2010/0084921 A1 Apr. 8, 2010

(51) Int. Cl.
*H02J 1/12* (2006.01)
*H02J 3/00* (2006.01)

(52) U.S. Cl. ................ 307/25; 307/13; 307/14; 307/29; 307/127; 307/147; 361/79; 324/107; 324/713; 340/657

(58) Field of Classification Search .................... 307/25, 307/13, 14, 127; 324/107; 340/310.18; 361/79
See application file for complete search history.

(56) References Cited

U.S. PATENT DOCUMENTS 4,628,395 A 12/1986 Sugishima
5,007,848 A * 4/1991 Lee .............................. 439/101
5,751,965 A 5/1998 Mayo et al.
5,777,833 A * 7/1998 Romillon ........................ 361/30
6,094,622 A * 7/2000 Hubbard et al. ................ 702/61
6,240,249 B1 5/2001 Henderson et al.
6,470,283 B1 * 10/2002 Edel ............................... 702/64
6,526,442 B1 2/2003 Stupek et al.
6,769,022 B1 7/2004 DeKoning et al.
2002/0116485 A1 8/2002 Black et al.
2003/0041030 A1 2/2003 Mansfield
2003/0093598 A1 5/2003 Park
2003/0221004 A1 11/2003 Stupek et al.
2004/0066665 A1 4/2004 Cheng
2004/0123149 A1 6/2004 Tyroler
2004/0257029 A1 * 12/2004 Sakamoto et al. ............ 318/802
2005/0094629 A1 5/2005 Zhao et al.
2005/0129035 A1 6/2005 Saito
2005/0204038 A1 9/2005 Medvinsky et al.
2005/0212526 A1 * 9/2005 Blades .......................... 324/543
2006/0085540 A1 4/2006 Mayerson et al.
2007/0291430 A1 12/2007 Spitaels et al.
2009/0212964 A1 * 8/2009 Hibma et al. ................ 340/657

OTHER PUBLICATIONS

International Search Report mailed Jan. 7, 2010 in PCT/US2009/005468.

(Continued)

*Primary Examiner* — Rexford Barnie
*Assistant Examiner* — Justen Fauth
(74) *Attorney, Agent, or Firm* — Davidson Berquist Jackson & Gowdey LLP

(57) ABSTRACT

The Universal Power Inlet System, or UPIS, is a method of providing universal attachment of 3 different types of electrical power systems into the input circuitry of a Power Distribution Unit, or PDU. This method allows use of either fixed or detachable power cord options permitting the PDU to be powered by any of the following types of electrical power sources: 3-Phase Delta, 3-Phase Star (or Wye) and Single-Phase. This method also describes a way to uniquely identify the specific power system the mentioned PDU is currently attached to. The method also optionally allows derivation of supplementary information about the electrical power system such as current capacity, or ampacity, of the power cord being used. All this information can be used for capacity monitoring and reporting as well as protection of PDU circuitry and power cords.

18 Claims, 8 Drawing Sheets

OTHER PUBLICATIONS

International Search Report and Written Opinion from PCT Application No. PCT/US2006/030704 mailed Apr. 18, 2007.
PCT International Search Report and Written Opinion mailed Oct. 16, 2006 in PCT/US2005/023719, International Filing Date Jun. 28, 2005.
CA Appln. No. 2,571,608—Aug. 4, 2008 CIPO Office Action.
CA Appln. No. 2,617,017—Feb. 3, 2011 CIPO Office Action.
EP Appln. No. 05764446.0 Search Report mailed Nov. 29, 2010.
MY Appln. No. PI20062195—Sep. 11, 2009 MYIPO Adverse Examination Report.
MY Appln. No. PI20063874—MYIPO Substantive Examination Adverse Report.
PCT Preliminary Examination Report in application PCT/US2008/007492 dated Jun. 6, 2008.
Preliminary Report on Patentability mailed Apr. 21, 2011 in PCT Appln. No. PCT/US2009/005468.
U.S. Appln. No. 11/208,704—Jan. 5, 2011 PTO Office Action.
U.S. Appln. No. 11/812,299—Jan. 25, 2011 PTO Office Action.
U.S. Appln. No. 12/640,675—Jan. 5, 2011 PTO Office Action.

* cited by examiner

| 3-PHASE DELTA | | | | | | |
|---|---|---|---|---|---|---|
| Input Phase | Bank 1 | | Bank 2 | | Bank 3 | |
| | A | B | C | D | E | F |
| X | ● | | | | ● | |
| Y | | | ● | | | ● |
| Z | | ● | | ● | | |

| INPUT TYPE DISCRIMINATION | | |
|---|---|---|
| Bit 1(msb)<br>Voltage across **C-F** ?<br>1-NO, 0-YES | 1 | ID=0b10 |
| Bit 0(lsb)<br>Voltage across **C-E** ?<br>1-NO, 0-YES | 0 | |

| 3-PHASE STAR (WYE) | | | | | | |
|---|---|---|---|---|---|---|
| Input Phase | Bank 1 | | Bank 2 | | Bank 3 | |
| | A | B | C | D | E | F |
| X | ● | | | | | |
| Y | | | ● | | | |
| Z | | | | | ● | |
| N | | ● | | ● | | ● |

| INPUT TYPE DISCRIMINATION | | |
|---|---|---|
| Bit 1(msb)<br>Voltage across **C-F** ?<br>1-NO, 0-YES | 0 | ID=0b00 |
| Bit 0(lsb)<br>Voltage across **C-E** ?<br>1-NO, 0-YES | 0 | |

| SINGLE-PHASE | | | | | | |
|---|---|---|---|---|---|---|
| Input Phase | Bank 1 | | Bank 2 | | Bank 3 | |
| | A | B | C | D | E | F |
| X | ● | | ● | | ● | |
| Y or **N** | | ● | | ● | | ● |

| INPUT TYPE DISCRIMINATION | | |
|---|---|---|
| Bit 1(msb)<br>Voltage across **C-F** ?<br>1-NO, 0-YES | 0 | ID=0b01 |
| Bit 0(lsb)<br>Voltage across **C-E** ?<br>1-NO, 0-YES | 1 | |

Figure 2

| DISCRIMINATED INPUT TYPE CODES | | |
|---|---|---|
| Non Powered | 0b11 | 3 |
| 3-Phase Delta | 0b10 | 2 |
| Single-Phase | 0b01 | 1 |
| 3-Phase Star (Wye) | 0b00 | 0 |

On this example V_C-F = V_C-E = 200 to 450Vac

| Discrimination Pin 2 DP2 (msb) | Discrimination Pin 1 DP1(lsb) | North American Current Capacity | INT'L Current Capacity | Current Capacity Code |
|---|---|---|---|---|
| Connected to E on power cord | Connected to E on power cord | 20A | 16A | 0b00 |
| Connected to E on power cord | Connected to F on power cord | 30A | 32A | 0b01 |
| Connected to F on power cord | Connected to E on power cord | 50A | 48A | 0b10 |
| Connected to F on power cord | Connected to F on power cord | 60A | 63A | 0b11 |

Figure 6

On this example V_DP2-F = V_DP1-F = 200 to 450Vac

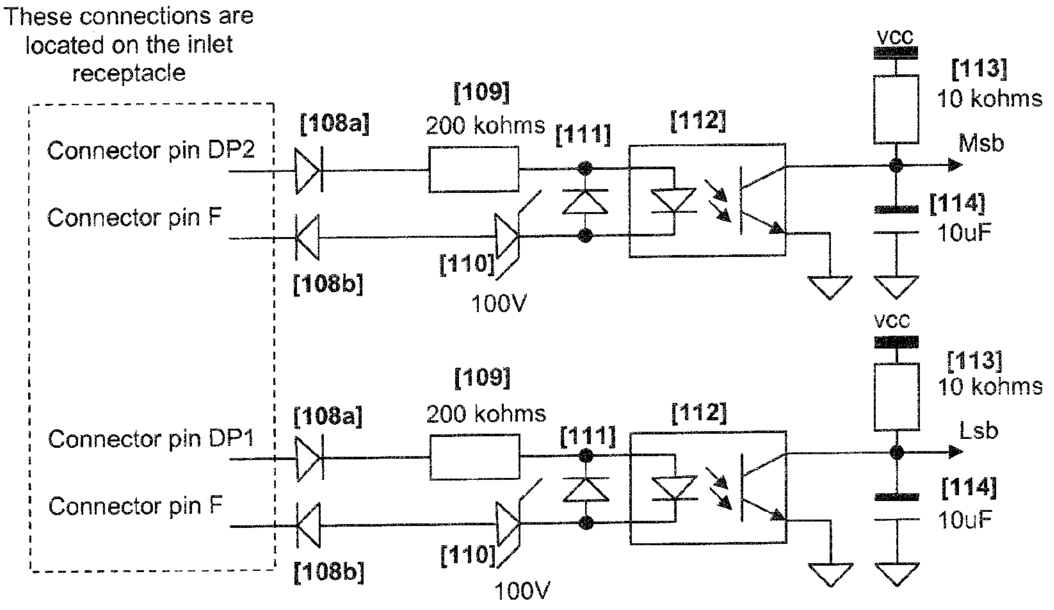

Figure 7

[119] 3-Phase Delta Load Splicing
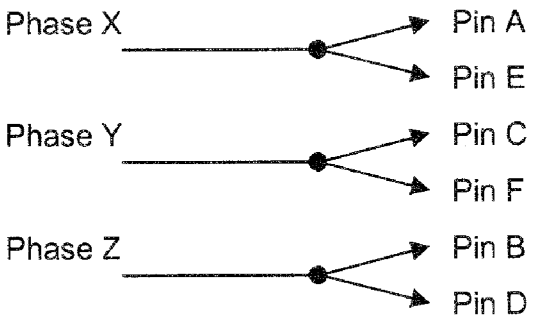
[120] 3-Phase Star (or WYE) Load Splicing
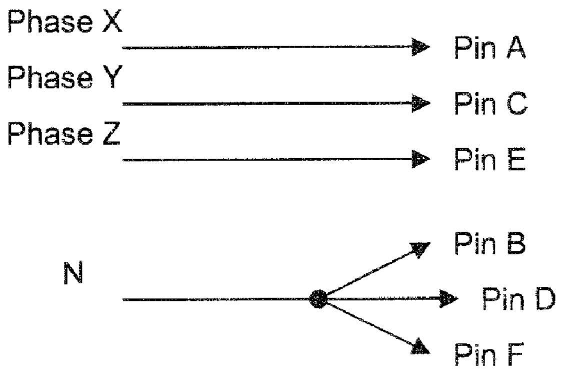
[121] Single Phase 3 Loads Splicing (with or without Neutral)
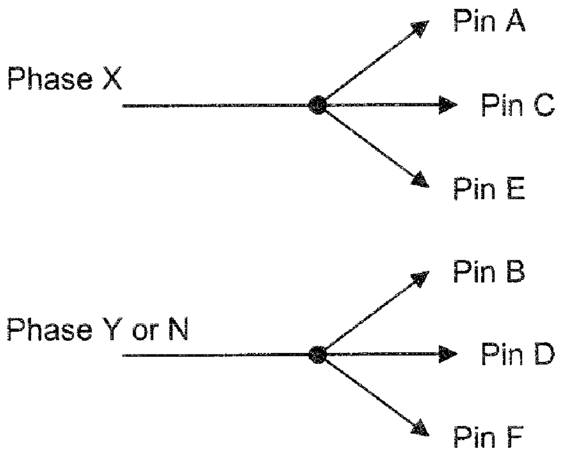
Figure 8

UNIVERSAL POWER INLET SYSTEM FOR POWER DISTRIBUTION UNITS

FIELD OF INVENTION

The Universal Power Inlet System, or UPIS, is an electrical wiring scheme using detachable or fixed power cords which allows a Power Distribution Unit, or PDU, to be easily powered by several types of electrical installations existing around the world as far as their specific electrical configurations and ratings as well as their particular physical specifications.

INTRODUCTION

Power distribution units, or PDUs, provide a way to distribute power from a single input source to a plurality of power outlets. Additional to the basic concept of power distribution, some PDUs also have the capability of controlling and monitoring key power parameters of each of these individual outlets. These PDUs are also known as intelligent power distribution units or IPDU. A typical use of IPDU is powering up a plurality of computer servers or any other IT appliances installed on data-center racks through a single power connection to the building's wiring system. For the sake of simplicity, the term PDU will be used throughout this document to refer to either the simplest form of PDU, a non-intelligent power strip, all the way to the most sophisticated metered and switched intelligent PDU with network connectivity.

In order to perform its function, the PDU needs to be connected to the building's electrical power installation which may vary in type as far a voltage and current ratings as well as its configuration on the number phase or poles. Another important factor is that each geographic location in the world may have its own standards for the electrical power systems with specific types of receptacles, phase system, voltage and current. Traditionally, a PDU would have to have different input systems to be able to connect to each of these particular electrical systems around the world. Even within a specific electrical installation, in a certain building, you may have a variety of types of power receptacles that the PDU's power input will need to match in order for it to be properly installed.

Historically the output of a PDU could be made universal by using internationally recognized, single phase receptacles, such as IEC320-C13 or IEC320-C19. These international receptacles are connected to the specific appliances' power inlets by means of adapter cords which makes the output section of a modern PDU truly universal and portable around the world. That being said, the last frontier of a truly universal and portable PDU would be solving its input circuitry limitations and specificity.

The Universal Power Inlet System, or UPIS, solves all these previously mentioned problems by providing a generic way to connect and identify many types of electrical system and properly attaching them into the PDU's power input circuitry. This is done by these 3 simple steps:

1. Branching out the electrical input phase(s) into 3 generic single phase banks each of them feeding n outlets;
2. Defining a specific wiring mapping for each of these 3 possible input configurations: 3-phase delta, 3-phase star (or wye) and single phase. Each of these input configurations are fed into the 3 generic single phase banks (this is done through specific splices for each specific input configuration);

3. Implementing an identification circuitry that will indicate to the system which specific input configuration is being used as well as the total power budget and any other vital information for the protection and safety compliance of the PDU.

There are two main categories that can be derived from the Universal Power Inlet System, or UPIS: the detachable power cord system and the fixed power cord system. These two systems share all the same electrical wiring map scheme as describe in this invention but differentiate from each other on the physical aspect and functionality of the power cord itself, one being detachable and the other permanently attached.

BRIEF DESCRIPTION OF DRAWINGS

Below are summarized descriptions of the drawings which are attached on the end of this document. Please refer to next section for detailed descriptions for these preferred but non-limiting diagrams and examples:

FIG. 2 shows the input phase to bank mapping for each type of connection with respective input type identification code.

FIG. 6 shows an example for the current capacity code assignments for the 2 supplementary discriminations pins as described on FIG. 5 which are based on two main standardized electrical systems: North America and International (or sometimes called European)

FIG. 7 shows an exemplary way to implement the electronic circuitry capable of discriminating the ID codes of FIG. 6 and yet keeping isolation between Primary LV and Secondary ELV/SELV circuitry on the PDU.

FIG. 8 shows the detailed wire splicing scheme for each of the input configuration types into the 3 distinct single phase banks as previously shown and described in FIG. 1, FIG. 2 and FIG. 5.

DETAILED DESCRIPTION OF AN EXAMPLE EMBODIMENT

Figure 1:
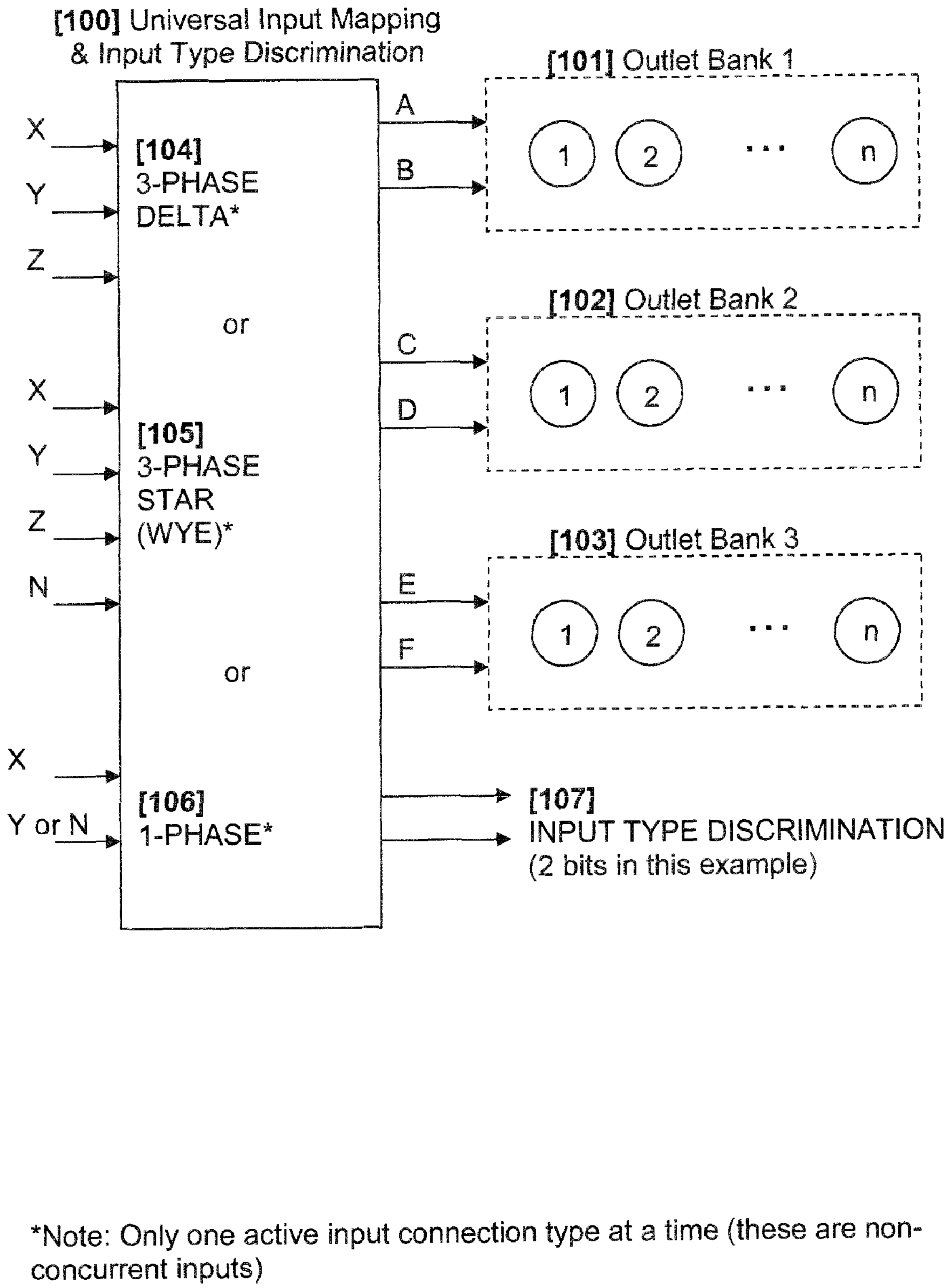
FIG. 1 shows a top level view of a Universal Power Inlet System, or UPIS, for each of the 3 possible input configuration types which depict the Universal Input Mapping & Input Type Discrimination functional block.

FIG. 1 shows the basic concept of abstraction of the power input types from the PDU's input circuitry. This abstraction is achieved by the Universal Input Mapping and Input Type Discrimination functional block 100 which maps any of the input types into 3 (or a number multiple of 3) banks of outlets 101, 102 and 103 and detects by means of special circuitry 107 which input type is currently being used. Each bank is electrically sourced by a single phase branch circuit derived from any of the following input types: 3-phase delta 104, 3-phase star (or wye) 105 and single phase 106. Each of these input types 104, 105 and 106 have unique splicing patterns that always terminate into 3 (or a number multiple of 3) individual single phase banks 101, 102 and 103. The splicing pattern is such that it allows unique identification of each input system by means of special circuitry 107 which is described in details on later section.

FIG. 2 shows the splicing scheme for each of the 3 input types. For each input type there are rows on the left which identify the phase letters while the columns on top designates, with letters as well, each of the 3 pairs of wires feeding the 3 banks. The shaded cells with dot mark links an input circuit to an output circuit while blank cells mean no connection. Just below this connection mapping there is a description of the universal input type discrimination logic which attributes binary values (1 or 0) to each of the two logic tests: if there is voltage across terminals C-F and if there is voltage across terminals C-E. The logic will attribute value 1 for absence of voltage (same potential points) and value 0 for presence of voltage (different potential point). The result is a two bit code which uniquely identifies each of the input types.

Figures 3, 4:
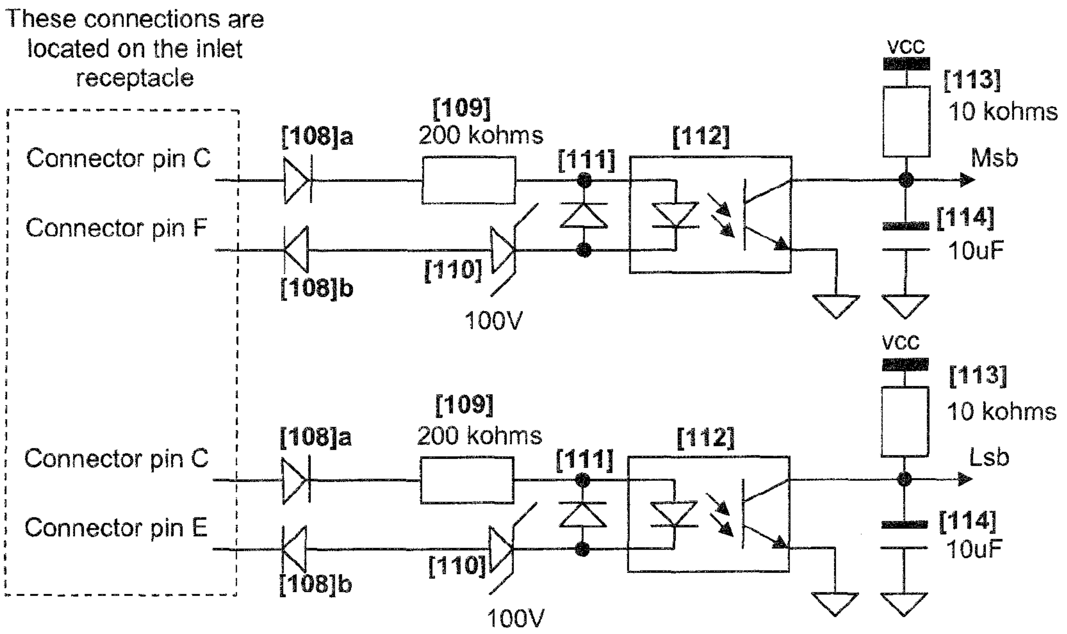
FIG. 3 shows the ID codes summary for each input type in both binary and decimal modes.
FIG. 4 shows an exemplary way to implement the electronic circuitry capable of discriminating the ID codes of FIGS. 2 & 3 and yet keeping isolation between Primary LV and Secondary ELV/SELV circuitry on the PDU.

FIG. 3 shows the codes attributed to each input type as described on FIG. 2. This table shows both the binary value as well and the equivalent decimal value. This table assumes the wire splicing map and discrimination logic as shown previously on FIG. 2.

FIG. 4 shows an exemplary electronic circuit for the input type discrimination logic which operates according to descriptions provided on FIG. 2 and FIG. 3. The diodes 108*a* and 108*b* prevent negative polarity cycles from flowing into biasing circuitry while allowing positive polarity cycles to flow. The resistor 109 limits the amount of current flowing thru the circuit while the zener diode 110 creates a 100V digital step behavior. The diode 111 avoids that increased reverse voltage damages opto-coupler's 112 input led due to leakage on rectifying diodes 108*a* and 108*b*. On the secondary side of the opto-coupler 112, resistor 113 and capacitor 114 filters out all AC component and delivers a DC level of VCC (logic state 1) or 0V (logic state 0) depending whether there is or not sufficient AC voltage on the primary section of the circuit (across input terminals of diodes 108*a* and 108*b*). The opto-coupler 112, or any other means of isolation, is necessary in order to keep electrical isolation barrier between Primary LV circuits and Secondary ELV/SELV circuits inside the PDU.

Figure 5:
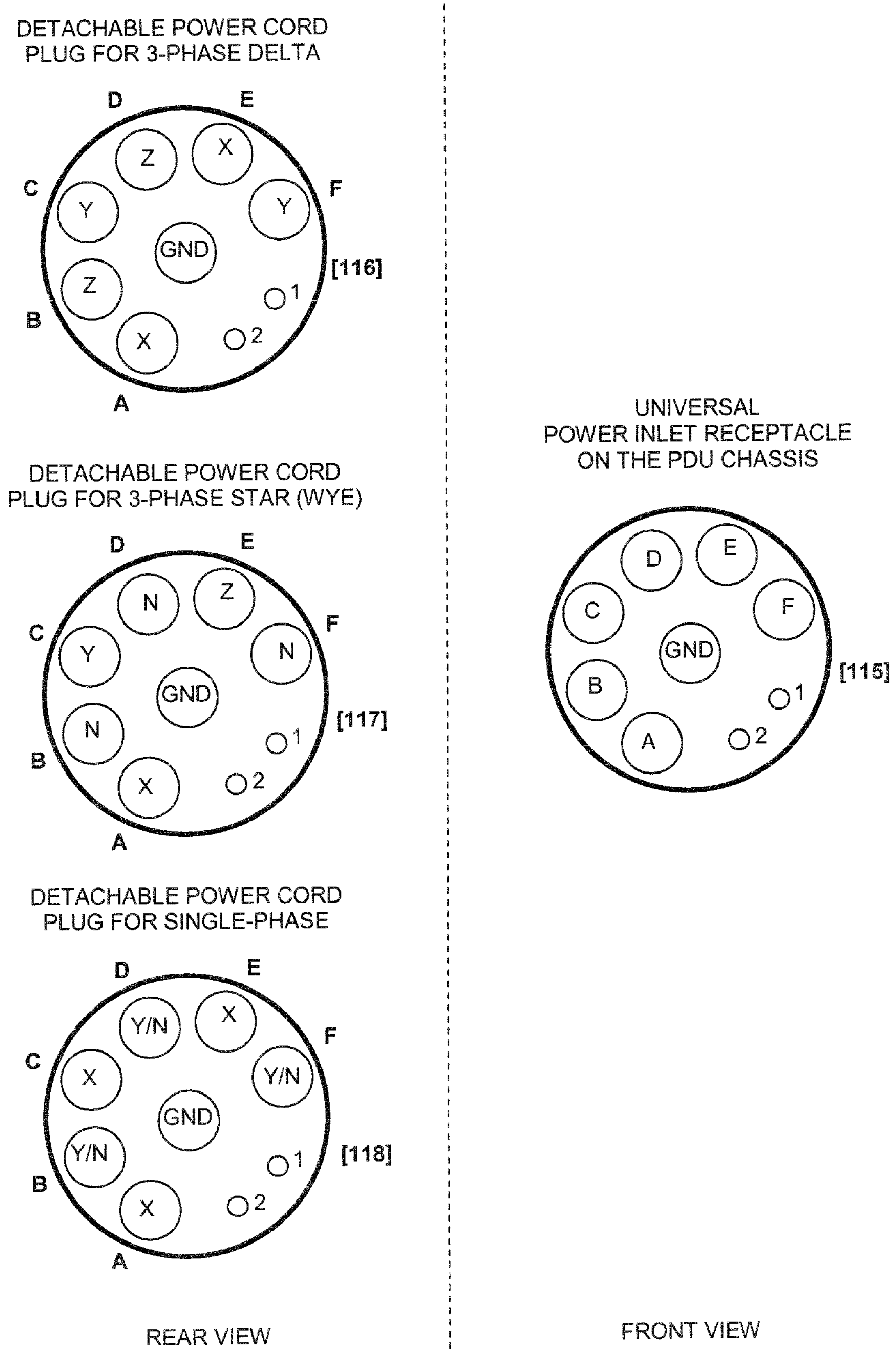
FIG. 5 shows the 3 detachable power cord plug types which are to be matted to universal inlet receptacle located on the PDU. On this plug/receptacle set a protective GND and 2 additional discrimination pins were added for supplementary power cord identification like, for instance, current capacity of the detachable power cord.

FIG. 5 shows the universal connector pin assignments according to FIG. 2 for a detachable power cord system. The universal power inlet receptacle 115 is located on the PDU while plugs 116, 117 and 118 are implemented on each detachable power cord according to its input type. Detachable plug 116 is used for 3-phase delta while detachable plug 117 is used for 3-phase star (or wye) and finally detachable plug 118 is used for single phase. In each plug the unique splicing map as described in FIG. 2 is done right before the plug terminals, usually inside the plug's back shell. A protective earth or chassis pin can be added for improved safety of the connection. Two additional pins were also added to illustrate supplementary identification parameters such as current capacity of the power cord which is described on next paragraph.

FIG. 6 shows the assigned codes for the two supplementary discrimination pins deployed in this example as current capacity identification. On this table the current capacity for each code is dependent on the regional settings of the unit whether North American or International electrical standards are to be used (the term International is sometimes replaced by European on certain applications). Each pin has a numbered designation DP1 and DP2 which can be either connected to terminal E or terminal F of the universal splicing map. The circuit that performs the code discrimination is very similar to the one described previously on FIG. 4, with the return path of each circuit connected to terminal F and the main path to DP1 or DP1 which is further described on FIG. 7.

FIG. 7 shows and exemplary electronic circuit for the supplementary discrimination pins DP1 and DP2 which operates according to descriptions provided on FIG. 6. The diodes 108*a* and 108*b* prevent negative polarity cycles from flowing into biasing circuitry while allowing positive polarity cycles to flow. The resistor 109 limits the amount of current flowing thru the circuit while the zener diode 110 creates a 100V digital step behavior. The diode 111 avoids that increased reverse voltage damages opto-coupler's 112 input led due to leakage on rectifying diodes 108*a* and 108*b*. On the secondary side of the opto-coupler 112, resistor 113 and capacitor 114 filters out all AC component and delivers a DC level of VCC (logic state 1) or 0V (logic state 0) depending whether there is or not sufficient AC voltage on the primary section of the circuit (across input terminals of diodes 108*a* and 108*b*). The opto-coupler 112, or any other means of isolation, is necessary in order to keep electrical isolation barrier between Primary LV circuits and Secondary ELV/SELV circuits inside the PDU.

FIG. 8 shows the detailed wire splicing scheme for each of the input configuration types into the 3 distinct single phase banks as previously shown and described in FIG. 1, FIG. 2 and FIG. 5. There are basically 3 types of splices that will map the respective input type into the universal pinout of 3 single phase banks with pin denominations A/B, C/D and E/F. Delta load connectivity is achieved by splicing scheme 119 which feeds each bank A/B, C/D and E/F with respective pair of phases X/Z, Y/Z and X/Y. Star or Wye load connectivity is achieved by splicing scheme 120 which feeds each bank A/B, C/D and E/F with respective pairs X/N, Y/N and Z/N (where N indicates the neutral pole). Single phase load connectivity is achieved by splicing scheme 121 which feeds each bank A/B, C/D and E/F with 3 identical branches of the input circuitry X/Y or X/N depending whereas the system is dual pole without neutral or single pole with neutral. By following this unique wire splicing scheme, it is possible, using detection circuitry of FIG. 4 to achieve the ID codes as described on FIG. 2. These ID codes allow the PDU to identify which power system it is being attached to and therefore derivation of important information necessary to monitor and control each specific type of input power connection being used. Of course, on the 3-phase star (wye) connection, the fourth 3-phase star power signal (the Neutral in FIG. 8) is a singular signal and is not interchangeable with any of the other phases (X, Y, or Z in FIG. 8). On the other hand, on 3-phase delta or single phase, the phase signals are interchangeable among themselves without affecting the functionality of the inventions described.

Figure 9:
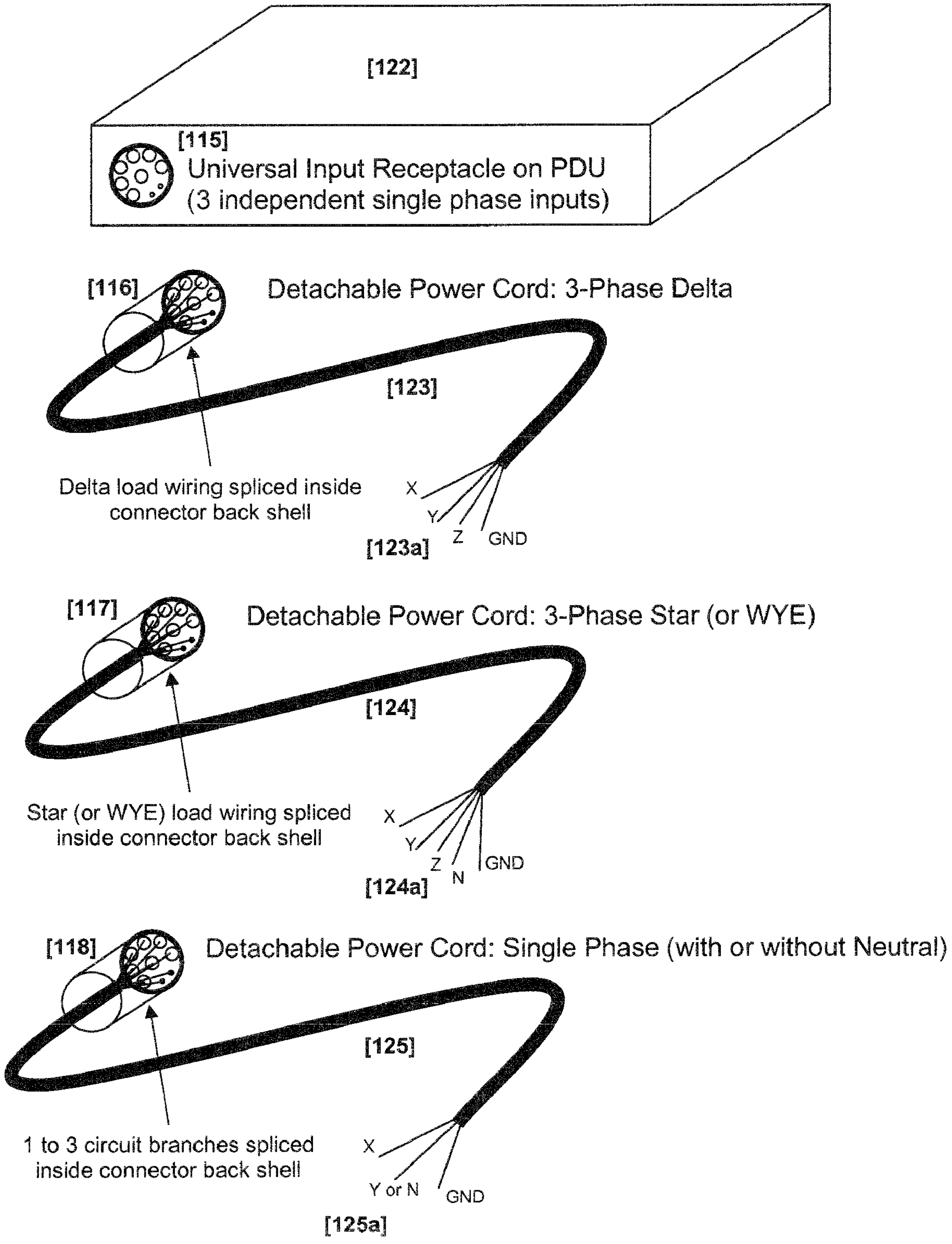
FIG. 9 shows a top level view of a detachable power cord system where the PDU with its universal power input receptacle can be connected to different types of power cord.

FIG. 9 shows a top level view of a detachable power cord system where the PDU 122 with its universal power input receptacle 115 can be connected to different types of detachable power cords 123, 124 and 125. The PDU 122 contains one universal inlet receptacle 115 depicting pinout as shown previously on FIG. 5 [115] where each of the pairs A/B, C/D and E/F are connected to the 3 independent single phase banks inside the PDU 122. A 3-phase Delta load detachable power cord 123 has the Delta splice as shown on FIG. 8 [119] inside the detachable plug 116 with pinout detail as shown on FIG. 5 [116]. The other end 123*a* of detachable power cord 123 is to be attached to any standard power plug property mating with the 3-Phase power receptacle located on the building's electrical installation. A 3-phase Star or Wye load detachable power cord 124 has the Star or Wye splice as shown on FIG. 8 [120] inside the detachable plug 117 with pinout detail as shown on FIG. 5 [117]. The other end 124*a* of detachable power cord 124 is to be attached to any standard power plug properly mating with the 3-Phase+Neutral power receptacle located on the building's electrical installation. A single-phase load detachable power cord 125 has the 3 loads (or circuit branches) splice as shown on FIG. 8 [121] inside the detachable plug 118 with pinout detail as shown on FIG. 5 [118]. The other end 125*a* of detachable power cord 125 is to be attached to any standard power plug properly mating with the Single-Phase power receptacle located on the building's electrical installation.

Figure 10:
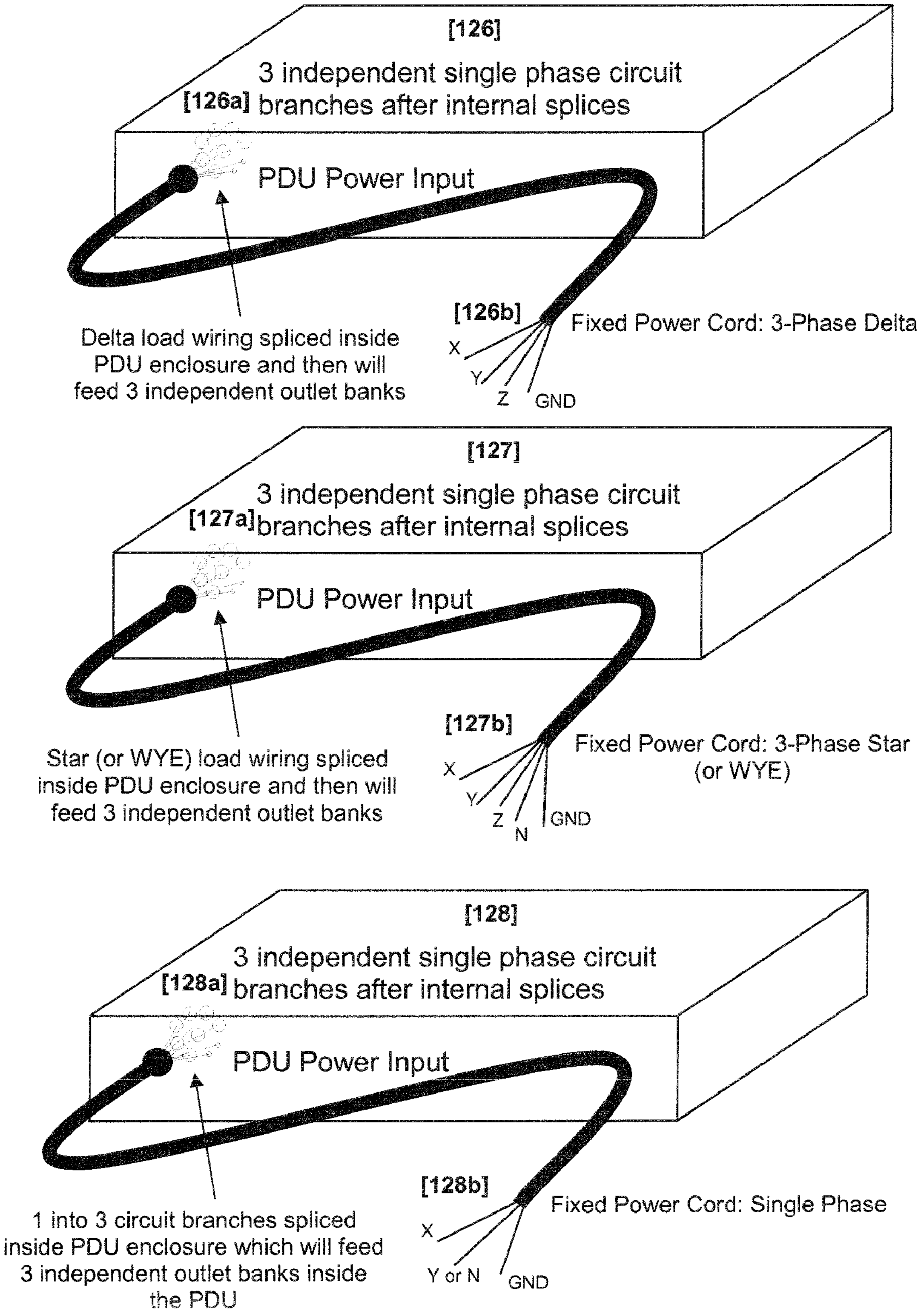
FIG. 10 shows a top level view of a fixed power cord system where the PDU input circuitry can be connected to different types of fixed power cord which are spliced up inside the enclosure to the universal 3 independent single phase circuits topology prior to feeding the internal outlet banks.

FIG. 10 shows a top level view of a fixed power cord system where the PDU input circuitry can be connected to different types of fixed power cord which are spliced up inside the enclosure to the universal 3 independent single phase circuits topology prior to feeding the internal outlet banks. The PDU 126 has a 3-Phase Delta load type fixed power cord. The Delta splice 126*a*, as shown on FIG. 8 [119], is done inside the PDU enclosure and delivers 3 independent single-phase circuits as shown on FIG. 1 at terminals A/B 101, C/D 102 and E/F 103. The other end 126*b* of fixed power cord is to be attached to any standard power plug properly mating with the 3-Phase power receptacle located on the building's electrical installation. The PDU 127 has a 3-Phase Star or Wye load type fixed power cord. The Star or Wye splice 127*a*, as shown on FIG. 8 [120], is done inside the PDU enclosure and delivers 3 independent single-phase circuits as shown on FIG. 1 at terminals A/B 101, C/D 102 and E/F 103. The other end 127*b* of fixed power cord is to be attached to any standard power plug properly mating with the 3-Phase+Neutral power receptacle located on the building's electrical installation. The PDU 128 has a Single-Phase load type fixed power cord. The Single-Phase into 3 branches splice 128*a*, as shown on FIG. 8 [121], is done inside the PDU enclosure and delivers 3 independent single-phase circuits as shown on FIG. 1 at terminals A/B 101, C/D 102 and E/F 103. The other end 128*b* of fixed power cord is to be attached to any standard power plug properly mating with the Single-Phase power receptacle located on the building's electrical installation.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

I claim:

1. A power distribution system to receive power from a selected one of: (i) a three-phase delta power supply, (ii) a three-phase star power supply, and (iii) a single-phase power supply, comprising:

a common receptacle keyed to receive as power signals on commonly shared plural receptacle pins any one of: (i) three-phase delta power, (ii) three-phase star power, and (iii) single-phase power;

a discrimination circuit to test a voltage on at least one of the plural receptacle pins to automatically determine which one of: (i) three-phase delta power, (ii) three-phase star power, or (iii) single-phase power is currently supplying the power signals on the plural receptacle pins;

plural sets of single-phase output conductors to supply single-phase power derived from the power signals, wherein said single-phase output conductors supply single-phase power based at least in part on which one of (i) three-phase delta power, (ii) three-phase star power, or (iii) single-phase power is currently supplying the power signals on the plural receptacle pins, as determined by said discrimination circuit;

plural output banks, each one output bank corresponding to a different one set of single-phase output conductors, to supply power to appliances associated with the power distribution system.

2. A power distribution system according to claim 1, wherein:

the common receptacle further includes two additional power discrimination pins electrically communicating with the discrimination circuit and receiving through the common receptacle said voltage on at least one of the plural receptacle pins, and wherein said discrimination circuit determines current capacity information of said power supply based at least in part on said voltage on said at least one of the plural receptacle pins.

3. A power distribution system according to claim 1, further including:

unique power supply cords, one for each of the three-phase delta power, three-phase star power, and single-phase power supplies, each power supply cord having a plug with plug pins mating with, respectively, the common receptacle and receptacle pins, each power supply cord internally and uniquely splicing conductors from the corresponding three-phase delta power supply, three-phase star power supply, and single-phase power supply onto the plug pins such that the plural sets of single-phase output conductors supply said single-phase power derived from the power signals.

4. A power distribution system according to claim 3, wherein:

the common receptacle further includes two additional power discrimination pins electrically communicating with the discrimination circuit and receiving through the common receptacle said voltage on at least one of the plural receptacle pins; and the unique power supply cords having two additional plug pins mating with, respectively, the two additional power discrimination pins to provide said voltage on at least one of the plural receptacle pins.

5. A power distribution system according to claim 4, wherein:

each power supply cord internally and uniquely splicing conductors from the corresponding three-phase delta power supply, three-phase star power supply, and single-phase power supply onto the two additional plug pins to supply said voltage on at least one of the plural receptacle pins.

6. A universal power inlet system for a power distribution unit used to power appliances, comprising:

(AA) a housing;

(BB) a universal input receptacle mounted on an exterior of the housing and having a receptacle pinout with first (A), second (B), third (C), fourth (D), fifth (E), and sixth (F) input conductor pins;

(CC) power cords each having a plug end with a common power cord pinout to mate with the receptacle pinout, including:

(cc1) a three-phase delta power cord matingly connectable to the universal input receptacle to supply first, second and third three-phase delta power signals, the plug end of the three-phase delta power cord having six conductors mapped to mate with the universal input receptacle so the first (A) input conductor pin receives the first three-phase delta power signal, the second (B) input conductor pin receives the third three-phase delta power signal, the third (C) input conductor pin receives the second three-phase delta power signal, the fourth (D) input conductor pin receives the third three-phase delta power signal, the fifth (E) input conductor pin receives the first three-phase delta power signal, and sixth (F) input conductor pin receives the second three-phase delta power signal;

(cc2) a three-phase star power cord matingly connectable to the universal input receptacle to supply first, second, third and fourth three-phase star power signals, the plug end of the three-phase star power cord having six conductors mapped to mate with the universal input receptacle so the first (A) input conductor pin receives the first three-phase star power signal, the second (B) input conductor pin receives the fourth three-phase star power signal, the third (C) input conductor pin receives the second three-phase star power signal, the fourth (D) input conductor pin receives the fourth three-phase star power signal, the fifth (E) input conductor pin receives the third three-phase star power signal, and sixth (F) input conductor pin receives the fourth three-phase star power signal; and (cc3) a single-phase power cord matingly connectable to the universal input receptacle to supply first and second single-phase power signals, the plug end of the single-phase power cord having six conductors mapped to mate with the universal input receptacle so the first (A) input conductor pin receives the first single phase power signal, the second (B) input conductor pin receives the second single-phase power signal, the third (C) input conductor pin receives the first single-phase power signal, the fourth (D) input conductor pin receives the second single-phase power signal, the fifth (E) input conductor pin receives the first single-phase power signal, and sixth (F) input conductor pin receives the second single-phase power signal;

(DD) an input discrimination circuit to electrically test for a presence of voltage across two selected ones of the first through sixth input conductor pins to automatically determine which one of (i) the three-phase delta power cord, (ii) the three-phase star power cord, and (iii) the single-phase power cord is supplying power to the universal input receptacle;

(EE) first, second and third sets of output electrical conductors in the housing each having a single-phase power configuration with single-phase power supplied by mapped ones of the first (A), second (B), third (C), fourth (D), fifth (E), and sixth (F) input conductor pins; and (FF) first, second and third outlet banks electrically connected, respectively, to corresponding ones of the first, second, and third sets of output electrical conductors to receive the single-phase power from corresponding ones of the first, second, and third sets of output electrical conductors, and to supply the single phase-power to associated ones of the appliances, based at least in part on which one of (i) the three-phase delta power cord, (ii) the three-phase star power cord, and (iii) the single-phase power cord is supplying power to the universal input receptacle, as determined by said input discrimination circuit.

7. The universal power inlet system according to claim 6, further including:

electrical splices within the power cords.

8. The universal power inlet systems according to claim 7, wherein:

the three-phase delta power cord includes:

a first wire having:

a first-wire input end to receive the first three-phase delta power signal and two first-wire output ends spliced internally from the input end to electrically communicate with both the first and the fifth input connector pins, a second wire having:

a second-wire input end to receive the second three-phase delta power signal and two second-wire output ends spliced internally from the input end to electrically communicate with both the third and the sixth input connector pins, and a third wire having:

a third-wire input end to receive the third three-phase delta power signal and two third-wire output ends spliced internally from the input end to electrically communicate with both the second and the fourth input connector pins.

9. The universal power inlet systems according to claim 7, wherein:

the three-phase star power cord includes:

a first wire having:

a first-wire input end to receive the first three-phase star power signal and a first-wire output end to electrically communicate with the first input connector pin, a second wire having:

a second-wire input end to receive the second three-phase star power signal and a second-wire output end to electrically communicate with the third connector pin, a third wire having:

a third-wire input end to receive the third three-phase star power signal and a third-wire output end to electrically communicate with the fifth input connector pin, and a fourth wire having:

a fourth-wire input end to receive the fourth three-phase star power signal and three fourth-wire output ends spliced internally from the input end to electrically communicate with all of the second, fourth, and sixth input connector pins.

10. The universal power inlet systems according to claim 7, wherein:

the single-phase power cord includes:

a first wire having:

a first-wire input end to receive the first single-phase power signal and three first-wire output ends spliced internally from the input end to electrically communicate with all of the first, third, and fifth input connector pins, and a second wire having:

a second-wire input end to receive the second single-phase power signal and three second-wire output ends spliced internally from the input end to electrically communicate with all of the second, fourth, and sixth input connector pins.

11. The power distribution of claim 1 wherein the common receptacle further includes two additional power discrimination pins electrically communicating with the discrimination circuit and receiving through the common receptacle said voltage on at least one of the plural receptacle pins; and the unique power supply cords having two additional plug pins mating with, respectively, the two additional power discrimination pins to provide said voltage on at least one of the plural receptacle pins, and the discrimination circuit determines current capacity information of said power supply based at least in part on said voltage on said at least one of the plural receptacle pins.

12. A method of partitioning electrical loads of a power distribution unit for appliances, comprising:

mapping three 3-phase delta power inputs into more than four conductors of a common plug receptacle;

mapping four 3-phase star inputs into the same more than four conductors of the same common plug receptacle;

mapping two single-phase inputs into the same more than four conductors of the same common plug receptacle;

electrically connecting two of the more than four conductors to a first power outlet bank to provide single-phase power to a first set of appliances;

electrically connecting two of the more than four conductors to a second power outlet bank to provide single-phase power to a second set of appliances;

electrically connecting two of the more than four conductors to a third power outlet bank to provide single-phase power to a third set of appliances, wherein:

the step of mapping three 3-phase delta power inputs includes mapping the three 3-phase delta power inputs into six separate conductors of the common plug receptacle;

the step of mapping the four 3-phase star inputs includes mapping the four 3-phase star power inputs into the same six separate conductors of the common plug receptacle;

the step of mapping the two single-phase inputs includes mapping the two single-phase inputs into the same six separate conductors of the common plug receptacle;

the step of electrically connecting two of the more than four conductors to the first power outlet bank includes connecting a unique two of the six conductors to the first power outlet bank;

the step of electrically connecting two of the more than four conductors to the second power outlet bank includes connecting another unique two of the six conductors to the second power outlet bank; and the step of electrically connecting two of the more than four conductors to a third power outlet bank includes connecting still another unique two of the six conductors to the third power outlet bank.

13. A power distribution system, comprising:

(AA) a housing;

(BB) first (A), second (B), third (C), fourth (D), fifth (E), and sixth (F) electrical connection points within the housing;

(CC) three power cords physically mounted into the housing, each having a supply end and a distribution end, including:

(cc 1) a three-phase delta power cord electrically connected at the supply end to first, second and third three-phase delta power signals and electrically spliced within the three-phase delta power cord so the first (A) electrical connection point receives the first three-phase delta power signal, the second (B) electrical connection point receives the third three-phase delta power signal, the third (C) electrical connection point receives the second three-phase delta power signal, the fourth (D) electrical connection point receives the third three-phase delta power signal, the fifth (E) electrical connection point receives the first three-phase delta power signal, and sixth (F) electrical connection point receives the second three-phase delta power signal;

(cc2) a three-phase star power cord electrically connected at the supply end to first, second, third and fourth three-phase star power signals and electrically spliced within the three-phase star power cord so the first (A) electrical connection point receives the first three-phase star power signal, the second (B) electrical connection point receives the fourth three-phase star power signal, the third (C) electrical connection point receives the second three-phase star power signal, the fourth (D) electrical connection point receives the fourth three-phase star power signal, the fifth (E) electrical connection point receives the third three-phase star power signal, and sixth (F) electrical connection point receives the fourth three-phase star power signal; and (cc3) a single-phase power cord electrically connected at the supply end to first and second single-phase power signals, and electrically spliced within the single-phase power cord so the first (A) electrical connection point receives the first single phase power signal, the second (B) electrical connection point receives the second single-phase power signal, the third (C) electrical connection point receives the first single-phase power signal, the fourth (D) electrical connection point receives the second single-phase power signal, the fifth (E) electrical connection point receives the first single-phase power signal, and sixth (F) electrical connection point receives the second single-phase power signal;

(DD) an input discrimination circuit to electrically test for a presence of voltage across two selected ones of the first through sixth electrical connection points to automatically determine which one of (i) the three-phase delta power cord, (ii) the three-phase star power cord, and (iii) the single-phase power cord is supplying power to the power distribution system;

(EE) first, second and third sets of output electrical conductors in the housing each having a single-phase power configuration with single-phase power supplied by mapped ones of the first (A), second (B), third (C), fourth (D), fifth (E), and sixth (F) electrical connection points; and (FF) first, second and third outlet banks electrically connected, respectively, to corresponding ones of the first, second, and third sets of output electrical conductors to receive the single-phase power from corresponding ones of the first, second, and third sets of output electrical conductors, and to supply the single phase-power to associated appliances based at least in part on which one of (i) the three-phase delta power cord, (ii) the three-phase star power cord, and (iii) the single-phase power cord is supplying power to the power distribution system, as determined by said input discrimination circuit.

14. A set of power cords for a power distribution system, comprising:

(A) a three-phase delta power cord including:

a first wire having:

a first-wire input end to receive a first three-phase delta power signal and two first-wire output ends spliced internally from the input end to electrically communicate the first three-phase delta power signal on each of the two first-wire output ends, a second wire having:

a second-wire input end to receive a second three-phase delta power signal and two second-wire output ends spliced internally from the input end to electrically communicate the second three-phase delta power signal on each of the two second-wire output ends, and a third wire having:

a third-wire input end to receive a third three-phase delta power signal and two third-wire output ends spliced internally from the input end to electrically communicate the third three-phase delta power signal on each of the two third-wire output ends;

(B) a three-phase star power cord including:

a first wire having:

a first-wire input end to receive the first three-phase star power signal and a first-wire output end to electrically communicate the first three-phase star power signal, a second wire having:

a second-wire input end to receive the second three-phase star power signal and a second-wire output end to electrically communicate the second three-phase star power signal, a third wire having:

a third-wire input end to receive the third three-phase star power signal and a third-wire output end to electrically communicate the third three-phase star power signal, and a fourth wire having:

a fourth-wire input end to receive the fourth three-phase star power signal and three fourth-wire output ends spliced internally from the input end to electrically communicate the fourth three-phase star power signal on each of the three fourth-wire output ends; and (C) a single-phase power cord including:

a first wire having:

a first-wire input end to receive the first single-phase power signal and three first-wire output ends spliced internally from the input end to electrically communicate the first single-phase power signal, and a second wire having:

a second-wire input end to receive the second single-phase power signal and three second-wire output ends spliced internally from the input end to electrically communicate the second single-phase power signal wherein the three-phase delta power cord, the three-phase star power cord and the single-phase power cord all terminate in respective commonly-configured plugs.

15. The set of power cords according to claim 14, wherein each of the commonly-configured plugs includes six electrical sockets, and wherein:

the two first-wire output ends, two second-wire output ends, and two third-wire output ends of the three-phase delta power cord terminate in the six electrical sockets of the commonly-configured plug of the three-phase delta power cord;

the first-wire output end, second-wire output end, third-wire output end, and three fourth-wire output ends of the three-phase star power cord terminate in the six electrical sockets of the commonly-configured plug of the three-phase star power cord; and the three first-wire output ends and three second-wire output ends of the single-phase power cord terminate in the six electrical sockets of the commonly-configured plug of the single-phase power cord.

16. A power distribution system, comprising:

a commonly-configured power input receptacle able to receive power from each of (i) a three-phase delta power supply, (ii) a three-phase star power supply, and (iii) a single-phase power supply, and to map the three-phase delta power supply, the three-phase star power supply, and the single-phase power supply into three separate single-phase outlet banks; and discrimination pins in the power input receptacle to receive branched versions of portions of (i) the three-phase delta power supply, (ii) the three-phase star power supply, and (iii) the single-phase power supply; and a discrimination circuit connected to the discrimination pins to automatically determine which of (i) a three-phase delta power supply, (ii) a three-phase star power supply, and (iii) a single-phase power supply is providing the power to the commonly-configured power input receptacle, wherein said input receptacle maps the three-phase delta power supply, the three-phase star power supply, and the single-phase power supply into three separate single-phase outlet banks based at least in part on which one of (i) three-phase delta power, (ii) three-phase star power, or (iii) single-phase power is determined to be providing power to the commonly-configured power intake receptacle, as determined by said discrimination circuit.

17. The power distribution system according to claim 16, wherein the three-phase delta power supply, the three-phase star power supply, and the single-phase power supply originate in, respectively, first, second, and third power cords, the system further comprising:

additional discrimination pins to determine a current capacity of the first, second, or third power cord associated with the three-phase delta power supply, a three-phase star power supply, and a single-phase power supply determined by the discrimination circuit to be providing the power to the commonly-configured power input receptacle.

18. The power distribution system according to claim 16, wherein the discrimination circuit further outputs a unique binary code associated with the three-phase delta power supply, three-phase star power supply, or single-phase power supply based on the automatic determination.

* * * * *